United States Patent Office 2,822,849
Patented Feb. 11, 1958

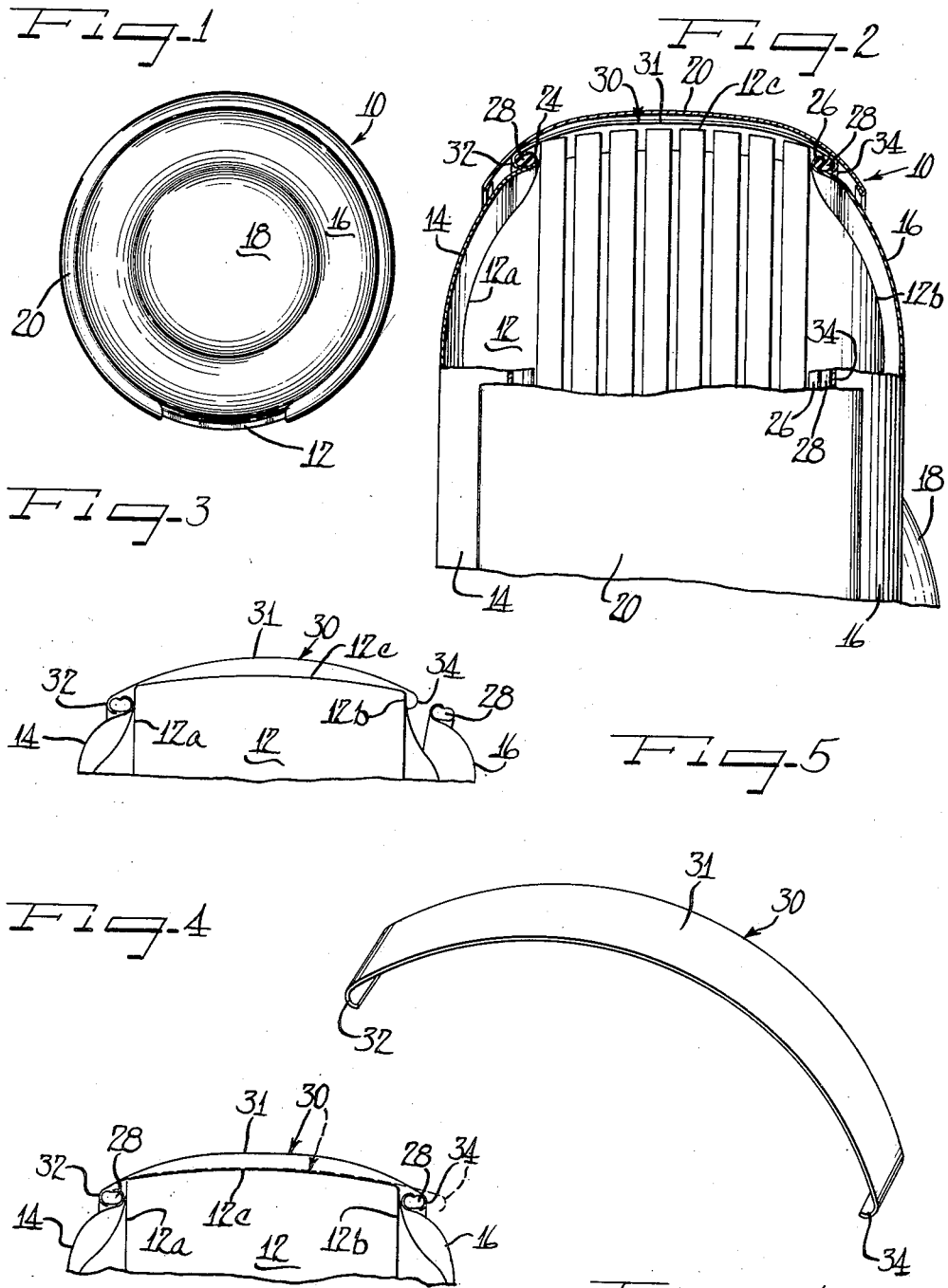

2,822,849
TIRE COVER STRUCTURE

George W. Schatzman, Detroit, Mich., assignor to Houdaille Industries, Inc., Detroit, Mich., a corporation of Michigan Application February 16, 1956, Serial No. 565,904

7 Claims. (Cl. 150—54)

This invention relates to a multi-part tire cover structure, as for jacketing or encasing an automobile spare wheel mounted exteriorly of the automobile.

Because of the shape and bulk of a tire, the spare tire cover structure is desirably made from individual separable components. In the present instance those components generally comprise a pair of side plate members which cover the sides of a tire, and a peripheral ring member which covers the tread of the tire. The peripheral ring member, while fairly rigid and self-sustaining, is elastically distortable to permit it to be manipulated into place over the tire tread and with its edges overlying the adjacent edges of the side plate members.

Assembly of a multi-part structure as herein involved is inevitably awkward and difficult due to the fact that the ring member must be distorted or sprung to effect its manipulation into place around the tire. For a motorist to so manipulate the ring member into place, at the same time maintaining the side plate members in their desired positions of orientation against the tire, is difficult indeed. Particularly difficult is the maintaining of the desired orientation of the side plates both radially of the tire and also angularly, as is especially desired if the side plate bears some emblem or indicia. Even in the situation where an associated hub cap or illusory hub cap member is engageable with associated mounting means to effect a retaining of one side-plate member, it is desirable that the user have both hands free to manipulate the peripheral ring into place.

An object of the present invention is the provision of a new and improved tire cover structure assembly.

A more specific object is to provide a simple and economical yet positive and effective means facilitating the assembly of multi-part tire cover structure, and particularly for holding the side plate members properly oriented in position against the tire sides, permitting the user to have the free use of both hands to manipulate the ring member into place.

A further object is to provide means for maintaining a pre-determined orientation of a tire cover side plate member against the tire.

In carrying out the invention in a preferred embodiment, there are provided one or more retainer elements such as sheet metal resilient clips adapted to span or overlie the tire tread and retainingly engage the side plate members to hold them in their desired position against the tire sides. By this simple yet effective means, assembly of the multi-part tire cover structure is greatly facilitated, for it permits the user to have the free use of both hands to manipulate the peripheral ring into place.

These and other objects, features, and advantages of the present invention will be readily apparent from the following description of an illustrative embodiment thereof, taken in conjunction with the accompanying drawings, in which:

Figure 1 is an elevational view of a tire, with the tire cover structure assembled to cover the tire;

Figure 2 is a fragmental end view thereof, with parts broken away and parts shown in section, and illustrating retaining means according to the principles of the present invention;

Figure 3 is a generally diagrammatical view indicating a step in the assembly of the said cover structure with the retainer clip shown as hooked over a marginal bead carried by one side plate;

Figure 4 is a generally diagrammatical view similar to Figure 3, the retainer clip being shown in broken lines to indicate a distorted condition permitting the marginal bead of the other side plate to be slipped under the associated hook end of the retainer clip, and showing in full lines the retainer clip as snapped over and into retaining engagement with that side plate marginal bead; and Figure 5 is an isometric view of the retainer clip shown in the previous figures.

A tire cover structure 10 embodying the principles of the present invention is illustrated in the drawings, and is there shown in its covering relationship to an associated tire 12 as of an automobile wheel.

It is contemplated that the tire 12 is part of a spare wheel assembly adapted to be mounted on the exterior of an automobile with a side 12a of the tire carried adjacent the automobile and with the opposite tire side 12b carried away from the automobile.

As shown, the tire cover structure 10 generally comprises a pair of annular ring- or disk-like side plates 14—16 adapted to cover respective sides 12a—12b of the tire 12. The side plates 14—16 are desirably formed from sheet metal.

A hub cap 18 or the like, which may be formed as an integral web or central extension of the outer side plate 16, is desirably provided, and covers the mounting assembly brackets or the like by which the wheel is supported.

A peripheral tread-covering member such as a resilient split ring or rim 20 is shown as adapted to cover the tread 12c of the tire. The peripheral ring 20 is shown as formed of resilient sheet material such as sheet metal, and desirably is of somewhat less than 360° of extent, so that it may be resiliently sprung or distorted and worked or manipulated over the tire tread.

The peripheral ring 20 is desirably of convex configuration, and its marginal portions extend axially of the tire an amount sufficient that they overlie the outermost portions of the side plates 14—16.

For providing a cushion or rattle-free engagement of the side plates and the peripheral ring 20, the outer portions of the side plates are over-turned as at 24—26 to carry annular cushion strips or beads 28 of resilient rubber or the like.

According to the present invention, for holding the side plates 14—16 in their pre-determined orientation covering the tire-sides 12a and 12b, and adjacent the tread 12c of the tire, the present invention provides one or more retaining members such as the resilient clips 30 shown in Figures 2 and 5.

Each clip 30 is shown as formed from a strip of resilient metal sheet stock, having an intermediate portion 31 bent into a general arcuate configuration. Retaining means are shown as provided for the clip 30 by bending its ends into a general hook-shaped configuration, as shown at 32—34, respectively.

The length and configuration of clip 30 is such that it must be resiliently flexed to span or straddle the tire tread and engage over the two side-plate beads 28, as by forming it to have effectively a radius of curvature less than that of the crown of the tire tread 12c. More specifically, the length and configuration of clip 30 is such that it must be thus distorted even to span over the tire tread to engage over the side faces thereof, thus permitting it to hold itself in place handily on the tread even while the user is positioning the side plates 14—16, and assuring a sufficient amount of flexure to effect a firm grip when applied clear over the engageable means provided by a side plate marginal bead 28.

A desired manner of assembly of the tire cover structure is indicated in Figures 3 and 4. As shown in the intermediate state of assembly in Figure 3, the end 32 of the clip 30 is first hooked over the marginal bead 28 carried by the inner side-plate 14, with the intermediate portion 31 of the clip 31 spanning the width of the tire tread. Both the side plate 14 and the clip 30 are held in resiliently retained position on the tire 12, even in this intermediate assembly state.

As shown in Figure 4 by the broken line representation of clip 30, the hook end 34 may be drawn outwardly to flex the clip 30 an amount sufficient to permit the outer side-plate 16 with its marginal bead 28 to pass clear, under the hook 34 and be placed in the desired position of orientation against the outer tire face 12b and adjacent the tire tread. When the outer side plate 16 has been so oriented, the user releases the hook end 34 of clip 30, to permit the internal stresses of the flexed clip 30 to cause its hooked end 34 to engage the side plate 16 over the marginal bead 28 and thus retain the side plate against the tire face 12b.

Desirably, two or three such clips 30 are employed, suitably spaced circumferentially of the tire to retain the side plates in their desired position of orientation.

With the side plate 14—16 so held, the peripheral ring 20 may be manipulated into place overlying the tire tread, with marginal portions of ring 20 overlapping portions of the side plates, as is shown in Figures 1 and 2. Because of the provision of the clips 30, the side plates 14 and 16 are held and maintained in their proper positions, and thus the user will have both hands free to manipulate the ring 20 onto the tire.

It will thus be observed that the novel tire cover structure provided according to the principles of the present invention is both economically formed and readily assembled. The flexibility of its components permits a standard size to be employed with different sizes of tires. It provides an effective and economical means for maintaining the desired orientation of the side plate members against the sides of the tire to permit and facilitate application of the peripheral tread-covering ring.

It will thus be seen from the foregoing description, considered in conjunction with the accompanying drawings, that the present invention provides a new and improved tire cover structure having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. In a tire cover structure, a pair of side plate members adapted to overlie opposite sides of a tire, a peripheral ring member adapted to cover the tire tread and having edges overlying adjacent edges of said side plate members, a resilient spring clip means having provisions thereon engageable with the side plate members to maintain a pre-determined orientation of said side plate members against the tire sides and adjacent the tire tread, said clip means being provided from a strip of resilient stock and having a configuration such that it must be elastically distorted to effect engagement of said provisions over said side plate members, but permitting it to be elastically distorted to effect retaining engagement of said side plate members to maintain a pre-determined orientation thereof against the tire sides and adjacent the tire tread.

2. In a tire cover structure, a pair of side plate members adapted to overlie opposite sides of a tire, a peripheral ring member adapted to cover the tire tread and having edges overlyingly engaging adjacent edges of said plate members, cushion strip means carried by said side plate members to cushion the engagement thereof with said ring member, a resilient spring clip means adapted to span the tread of said tire under the ring member, said clip means being provided from a strip of resilient stock having its respective end portions bent over to retainingly engage such cushion strip, said clip means being of a configuration such as to require an elastic distortion thereof to effect retaining interengagement of its ends over said cushion strip means to thereby maintain a pre-determined orientation of said side plate members.

3. In a tire cover structure, a pair of side plate members adapted to overlie opposite sides of a tire, a peripheral ring member adapted to cover the tire tread and having edges overlying adjacent edges of said side plate members, a resilient spring clip means adapted to span the tread of said tire under the ring member, interengageable means carried by the clip and by the side plate members to maintain a pre-determined orientation of said side plate members against the tire sides and adjacent the tire tread, said clip means being provided from a strip of resilient stock formed into a general arcuate configuration with a radius of curvature less than that of the crown of the tire tread to provide that said clip must be elastically distorted to effect retaining interengagement of said interengageable means.

4. In a tire cover structure, a pair of side plate members adapted to overlie opposite sides of a tire, a peripheral ring member adapted to cover the tire tread and having edges overlying adjacent edges of said side plate members, and retaining means held to one of said side plate members and adapted to span the tread of the tire and retainingly engage the other of said side plate members to maintain a pre-determined orientation thereof against the associated tire side.

5. In a tire cover structure, a pair of side plate members adapted to overlie opposite sides of a tire, a peripheral ring member adapted to cover the tire tread and having edges overlyingly engaging adjacent edges of said side plate members, cushion strip means carried by said side plate members to cushion the engagement thereof with said ring member, means engageable over the tire periphery and retainingly engageable with the cushion strip means of the side plates for maintaining a pre-determined orientation of said plates against the tire sides and adjacent the tire tread.

6. In a tire cover structure, a pair of side plate members adapted to overlie opposite sides of a tire, a removable peripheral ring member adapted to cover the tire tread and having edges overlyingly engaging adjacent edges of said side plate members, cushion strip means carried by said side plate members to cushion the engagement thereof with said ring member, and means for maintaining a pre-determined orientation of said plates against the tire sides and adjacent the tire tread before and during application of said ring member and during removal of the ring member.

7. For use in combination with a tire cover on a wheel carrying a tire on the opposite sides of which are applied respective cover plates and over the tread portion of which is applied a peripheral cover member overlapping the margins of said side plates, a spring clip member comprising an arched resilient strip stock body with turned gripping jaws at its respective opposite ends normally spaced apart less than the width between the outer sides of the cover side plate margins on the tire but retainingly engageable therewith upon spreading the jaws apart by resilient flexing of said resilient clip body to a less arched condition to straddle the tire tread before application of said peripheral cover member over the tread and over the clip and side plate margins.

References Cited in the file of this patent

UNITED STATES PATENTS

| | | |
|---|---|---|
| 1,946,326 | Lyon | Feb. 6, 1934 |
| 1,956,633 | Tyson | May 1, 1934 |
| 1,986,859 | Short | Jan. 8, 1935 |
| 2,019,987 | Lyon | Nov. 5, 1935 |
| 2,109,664 | Fergueson | Mar. 1, 1938 |